Sept. 18, 1951     C. R. MOCKRIDGE     2,568,084
MULTIPLE VARIABLE ORIFICE VALVE
Filed Dec. 20, 1946
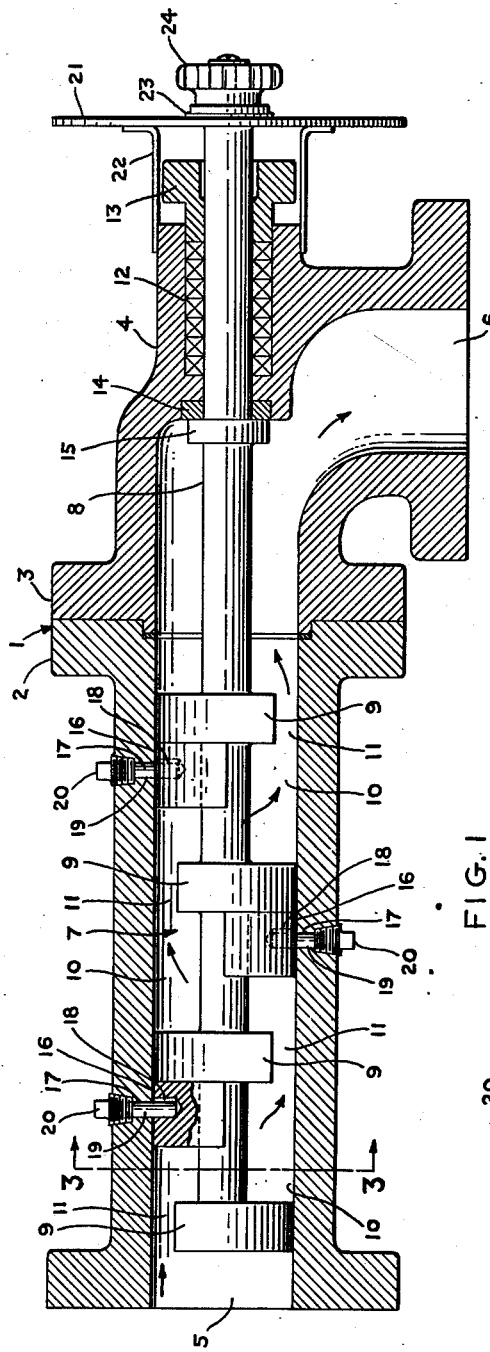
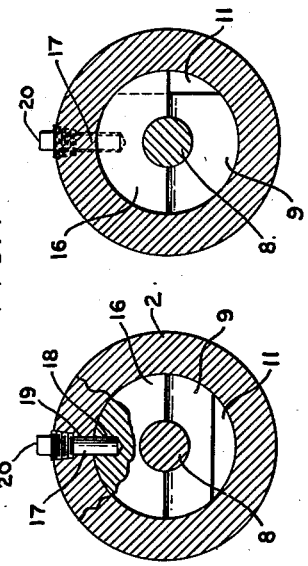
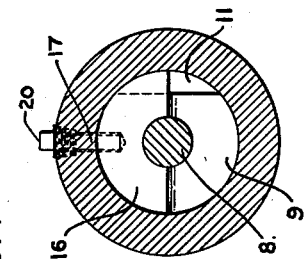
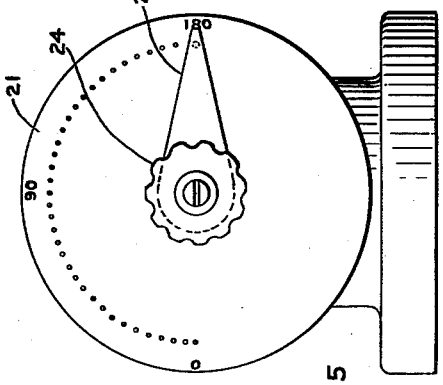
C. R. MOCKRIDGE
*INVENTOR.*
BY Patented Sept. 18, 1951

2,568,084

UNITED STATES PATENT OFFICE 2,568,084

MULTIPLE VARIABLE ORIFICE VALVE

Chester R. Mockridge, Nutley, N. J., assignor to Worthington Pump and Machinery Corporation, Harrison, N. J., a corporation of Delaware Application December 20, 1946, Serial No. 717,357

15 Claims. (Cl. 277—39)

1

This invention relates to multiple orifice pressure reducing devices and more particularly to such devices in which the size of orifices and hence the total pressure drop may be varied.

Multiple orifice pressure reducing devices of the general construction described herein have been employed with considerable success, particularly from the standpoint of a minimum amount of wear and silent operation, in by-pass lines for high pressure pumps where pressure drops of as high as 2000 p. s. i. are required. In these units the pressure reduction is accomplished in a series of pressure drop stages caused by the passage of fluid through a series of orifices and turbulence chambers, the orifices and turbulence chambers being formed by a plurality of segmented flanges on a spool positioned within the bore of a housing.

Heretofore the size of the orifices was fixed and, as a result, there were two main undesirable features associated with the use of the device, viz., (1) continuous bleed-off of high pressure fluid due to the fixed, open orifices resulted in a waste of energy, and (2) changes in the desired pressure drop necessitated removal of the device and insertion of another unit having the required pressure reducing characteristics. These undesirable features gave rise to a third, namely, that automatic by-pass control was not possible without the addition of extra flow controlling elements to the circuit.

It is the broad object of the present invention to provide a pressure reducing device of the type described in which the above mentioned undesirable features are eliminated but which has the desirable features of minimum wear and silent operation. This is accomplished by providing means for varying the size of the orifice openings from closed to fully opened. More specifically, stationary sealing members act to cover or uncover the orifices in accordance with the radial position of a rotatable, flanged, orifice forming spool.

With these and other objects in view, as may appear from the accompanying specification, the invention consists of various features of construction and combination of parts, which will be first described in connection with the accompanying drawings, showing a multiple variable orifice of a preferred form embodying the invention, and the features forming the invention will be specifically pointed out in the claims.

In the drawings:

Figure 1 is a longitudinal section of the improved pressure reducing multiple orifice.

2

Figure 2 is a section taken along the line 3—3 of Figure 1.

Figure 3 is the same as Figure 2 except that the orifices are half covered by the sealing members due to 90° rotation of the spool.

Figure 4 is a view in perspective of one of the sealing members.

Figure 5 is an end view taken from the right of Figure 1.

Referring to the drawings, the improved multiple orifice has a housing 1 which may be a single casting or preferably, as shown, composed of a flanged tubular section 2 joined at one end by a flanged elbow section 3. The elbow section 3 is provided with a boss 4 at the junction of the axis of tubular section 2 with the outer wall of the elbow 3. The open flanged end of the tubular section 2 is the inlet 5 of the unit while the open flanged end of the elbow 3 is the outlet 6, which has an axis substantially normal to the axis of the inlet 5 and the tubular section 3. Within the tubular section 3 is a central cylindrical pressure reducing chamber 7 having a constant diameter.

A spool 8 having a plurality of spaced orifice forming flanges 9 is rotatably supported in the chamber 7 and has its axis coincidental with the axis of the chamber. The flanges 9 have substantially the same diameter as the central chamber 7 and therefore divide it into a series of turbulence chambers 10. The orifices 11 may be simply formed by removing a segment from, or machining a flat on, the annular flanges 9. The orifices 11 form inlets and outlets for the turbulence chambers 10 and are preferably formed on diametrically opposite sides of adjacent flanges 9 so as to provide a sinuous path for fluid flowing through the chamber 7. The individual orifices may be all of the same size or may vary in size in accordance with pressure and velocity requirements.

The boss 4 of the elbow 3 is bored to permit one end of the spool 8 to extend therethrough to the exterior of the unit. The boss may be further machined and threaded to accommodate a stuffing box 12 and gland 13 encircling the spool 8. The portion of the boss within the elbow 3 is counterbored to hold a thrust washer 14 which bears on a thrust flange 15 of the spool 8 to resist axial movement of the spool due to the unbalanced forces or pressure thereon. A thrust bearing and a suitable stuffing box can, of course, be used instead of the thrust washer 14 if particularly low resistance to rotation of the spool 8 is desired.

Sealing members 16 are provided for the orifices 11 which take the form of half-rings or semi-annular bodies as shown in Figure 4. The outer diameter of the sealing members is that of the flanges 9 or chamber 7 and the inner diameter is that of the spool 8. The sealing members 16 are disposed within the turbulence chambers 10 at the outlet sides thereof and have the same radial position relative to one another as do the orifices 11, i. e., adjacent sealing members are preferably diametrically opposed. The sealing members 16 are held somewhat loosely fixed to the wall of the tubular section 2 by means of pins 17. The pins 17 fit into radial holes 18 in the members 16 and have the other ends fitted into holes 19 in the section 2. The holes 19 are tapped to accommodate threaded plugs 20 which hold the pins 17 in place. The fit of the pins 17 and the holes 18 is loose so that pressure acting on the inlet face of the members 16 may cause a slight axial movement thereof and promote intimate contact or sealing engagement of the members 16 with the flanges 8.

As is particularly clear in Figures 2 and 3, the effective size or area of the orifices 11 may be varied by rotation of the spool 8. In the position of Figures 1 and 2 the orifices 11 are fully uncovered. Ninety degree rotation of the spool 8, however, causes half of the orifice to be covered by the sealing member 16 as shown in Figure 3. One hundred and eighty degree rotation of the spool 8 causes the orifices to be completely closed and fluid flow through the unit is blocked.

In actual operation the high pressure fluid enters the inlet 5 in the direction of the arrow. The first significant degradation of energy occurs at the orifice 11 formed by the first flange 9 and the wall of chamber 7 and is caused by the hydraulic loss entailed in converting pressure energy into velocity. The next drop in energy occurs in the first turbulence chamber 10 which lies between the first and second flanges wherein part of the velocity through the first orifice is converted back into pressure. The flow enters the second orifice which is diametrically opposite or 180° from the first one. This arrangement produces a greater drop in energy than one in which the orifices are in line due to reduction in velocity of approach and the change in direction of flow. The flow proceeds in a similar manner through the remaining orifices 11 and turbulence chambers 10 with additional losses of energy and finally flows into the low pressure circuit through the outlet 6. When it is desired to vary the pressure drop or to cut off flow through the unit, the portion of the spool 8 extending outside of the housing 1 is manually or automatically rotated to change the area of orifice opening 11 as required.

When required, suitable means for fixing and indicating the radial position of the spool 8 may be included in the device. These may take many forms but are shown in Figures 1 and 5 as including a dial 21 graduated in degrees and attached by means of a flanged collar 22 to the boss 4. A radial arm 23 is attached to the outside end of the spool 8 and rides over the face of the dial 21. The arm 23 is made of resilient material and its outer end has a nib which fits into the detented graduations on the face of the dial to prevent accidental movement of the spool. The spool 8 is manually rotated by means of the knob 24 suitably attached thereto.

In a pressure breakdown, the pressure energy may be converted to velocity energy as well as dissipated in the form of heat, turbulence, etc. It is essential that the increase in velocity due to this conversion be limited so that high velocity, eroding jets are not produced. Experience has shown that the major share of the pressure energy can be dissipated in the first few turbulence chambers 10 or pressure stages of this device without appreciable wear or noise. This makes it possible to enlarge the orifices 11 progressively or in the final stages to produce the small remaining drop without high velocities.

The flexibility added to the multiple orifice by providing means for varying the orifice size and pressure drop fits it for many types of automatic and semi-automatic applications.

It is to be understood that the invention is not to be limited to the specific embodiments herein described but may be widely modified as covered by the following claims.

What is claimed is:

1. A multiple orifice pressure reducing device comprising a housing having a central chamber with inlet means and outlet means, a rotatable spool in said chamber having a plurality of spaced circular flanges with diameters substantially equal to the diameter of said chamber, each of said flanges having a section removed to form an orifice for the passage of fluid, a semi-annular sealing member for each of said orifices and having a diameter substantially equal to the diameter of said central chamber and the diameter of said spool pinned within said central housing on the high pressure side of said flanges and cooperating with the flanges for varying the effective size of said orifices by rotation of the spool, and means for preventing axial movement of said spool.

2. A multiple orifice pressure reducing device comprising a housing having a central chamber with inlet means and outlet means, a rotatable spool in said chamber having a plurality of longitudinally spaced circular flanges with diameters substantially equal to the diameter of said chamber, each of said flanges having a section removed to form an orifice, the section from one flange being removed from a different radial position to that of an adjacent flange to form a sinuous passage for a sinuous fluid through the central chamber, means for varying the effective size of each of said orifices, and means for preventing axial movement of said spool.

3. A multiple orifice pressure reducing device comprising a housing having a central chamber with inlet means and outlet means, a rotatable spool in said chamber having a plurality of longitudinally spaced circular flanges with diameters substantially equal to the diameter of said chamber, each of said flanges having a section removed to form an orifice, the remaining flange portions of adjacent flanges being diametrically opposed to form a sinuous passage for fluid through the central chamber, means for varying the effective size of said orifices, and means for preventing axial movement of said spool.

4. A multiple variable orifice pressure reducing device comprising a housing having a central cylindrical chamber with inlet means and outlet means, a spool rotatably mounted within said chamber and having a plurality of circular flanges with diameters substantially equal to the diameter of said chamber, said flanges partitioning said chamber into a series of turbulence chambers, each of said flanges having a section removed to form an orifice, said orifices connecting said inlet means, turbulence chambers, and outlet means in series relationship, means for varying the effective size of each of said orifices, and means for preventing axial movement of said spool.

5. A multiple variable orifice pressure reducing device comprising a housing having a central cylindrical chamber with inlet means and outlet means, a spool rotatably mounted within said chamber and having a plurality of longitudinally spaced circular flanges with diameters substantially equal to the diameter of said chamber, said flanges partitioning said chamber into a series of turbulence chambers, each of said flanges having a section removed to form an orifice, the orifice in one flange being diametrically opposed to the orifice in the adjacent flange so that each turbulence chamber has an inlet and outlet which occupy different radial positions, means for varying the effective size of each of said turbulence chamber outlets, and means for preventing axial movement of said spool.

6. A multiple variable orifice pressure reducing device comprising a housing having a central cylindrical chamber with inlet means and outlet means, a spool rotatably mounted within said chamber and having a plurality of longitudinally spaced circular flanges thereon with diameters substantially equal to the diameter of said chamber, said flanges partitioning said chamber into a series of turbulence chambers, each of said flanges having a section removed to form an orifice, said orifices connecting said inlet means, turbulence chambers, and outlet means in series relationship, a sealing member for the outlet orifice of each of said turbulence chambers and cooperating with said flanges to vary the effective sizes of said orifices upon rotation of said spool, and means for preventing axial movement of said spool.

7. In a multiple orifice pressure reducing device having a housing with a central cylindrical chamber having an inlet at one end and an outlet at the opposite end, a rotatable spool having its axis coincidental with the axis of said chamber, said spool having a plurality of spaced circular flanges thereon with diameters substantially equal to the diameter of said chamber, each of said flanges having a segment removed therefrom to form an orifice, the orifice of one flange being diametrically opposite of the orifices of adjacent flanges, a plurality of substantially stationary semi-annular sealing members of substantially the diameter of said flanges pinned to the wall of said chamber one in contact with the high pressure side of each of said flanges, and means for preventing axial movement of said spool.

8. A multiple variable orifice pressure reducing device as claimed in claim 1 including means connecting said sealing members to said housing, said connecting means constructed and arranged to permit limited axial movement of the sealing members relative to said flanges.

9. A multiple variable orifice pressure reducing device as claimed in claim 6 including pins carried by said housing, said sealing members provided with holes to receive said pins, said holes being shaped to permit limited axial movement of the sealing members relative to said flanges.

10. In a multiple variable orifice pressure reducing device, a housing having a central cylindrical chamber provided with an inlet and an outlet, a spool rotatably mounted within said chamber, a plurality of longitudinally spaced circular flanges on said spool and having diameters substantially equal to the diameter of the chamber and partitioning said chamber into a plurality of turbulence chambers, each of said flanges having a peripheral section cut away which cooperating with said housing forms an orifice to establish communication between adjacent turbulence chambers, means for varying the effective size of each of said orifices, and means for preventing axial movement of said spool.

11. A multiple variable orifice pressure reducing device as claimed in claim 10 wherein the cut away peripheral sections of adjacent flanges are disposed at different perimetral locations of the flanges to provide a sinuous flow path for fluid through the chamber.

12. In a multiple variable orifice pressure reducing device as claimed in claim 10 wherein said means for varying the effective size of said orifices consists of sealing members mounted in said chamber one adjacent each of said flanges whereby by rotation of said spool the effective size of the orifices may be varied.

13. In a multiple variable orifice pressure reducing device as claimed in claim 10 whereby said means for varying the effective size of said orifices consists of sealing members mounted in said chamber one adjacent each of said flanges whereby by rotation of said spool the effective size of the orifices may be varied, the cut away peripheral sections of adjacent flanges being disposed at different perimetral locations of the flanges to provide a sinuous flow path for fluid through the chamber.

14. In a multiple variable orifice pressure reducing device as claimed in claim 10 wherein said means for varying the effective size of said orifices consists of sealing members mounted in said chamber one adjacent each of said flanges whereby by rotation of said spool the effective size of the orifices may be varied, the cut away peripheral sections of adjacent flanges being disposed at different perimetral locations of the flanges to provide a sinuous flow path for fluid through the chamber, and means connecting said sealing members to said housing to permit limited axial movement of the sealing members relative to the flanges.

15. In a multiple variable orifice pressure reducing device as claimed in claim 10 wherein said means for varying the effective size of said orifices consists of sealing members mounted in said chamber one adjacent each of said flanges whereby by rotation of said spool the effective size of the orifices may be varied, the cut away peripheral sections of adjacent flanges being disposed at different perimetral locations of the flanges to provide a sinuous flow path for fluid through the chamber, pins carried by said housing, said sealing members provided with holes to receive said pins, said holes being shaped to permit limited axial movement of the sealing members relative to said flanges.

CHESTER R. MOCKRIDGE.

REFERENCES CITED

The following references are of record in the file of this patent:

UNITED STATES PATENTS

| Number | Name | Date |
|---|---|---|
| 2,105,198 | McNamara | Jan. 11, 1938 |
| 2,169,554 | Buchanan | Aug. 15, 1939 |